United States Patent
Leong et al.

(10) Patent No.: US 8,830,819 B2
(45) Date of Patent: Sep. 9, 2014

(54) NETWORK SWITCH WITH BY-PASS TAP

(75) Inventors: Patrick Pak Tak Leong, Palo Alto, CA (US); Thomas Kwok Yin Cheung, Fremont, CA (US)

(73) Assignee: Gigamon Inc., Milpitas, CA (US)

( * ) Notice: Subject to any disclaimer, the term of this patent is extended or adjusted under 35 U.S.C. 154(b) by 1104 days.

(21) Appl. No.: 12/714,203

(22) Filed: Feb. 26, 2010

(65) Prior Publication Data

US 2011/0211443 A1    Sep. 1, 2011

(51) Int. Cl.
*H04L 12/26* (2006.01)
*H04L 29/06* (2006.01)
*H04L 12/933* (2013.01)
*H04L 12/707* (2013.01)

(52) U.S. Cl.
CPC ............ *H04L 63/1416* (2013.01); *H04L 49/10* (2013.01); *H04L 63/02* (2013.01); *H04L 45/24* (2013.01)
USPC ............................ 370/217; 370/221; 370/227

(58) Field of Classification Search
CPC combination set(s) only.
See application file for complete search history.

(56) References Cited

U.S. PATENT DOCUMENTS

| 7,424,018 | B2 | 9/2008 | Gallatin et al. | |
|---|---|---|---|---|
| 7,436,832 | B2 | 10/2008 | Gallatin et al. | |
| 7,440,467 | B2 | 10/2008 | Gallatin et al. | |
| 7,792,047 | B2 | 9/2010 | Gallatin et al. | |
| 7,937,761 | B1 * | 5/2011 | Bennett | 713/153 |
| 8,144,601 | B2 * | 3/2012 | Liu | 370/241.1 |
| 8,169,893 | B1 * | 5/2012 | Getker | 370/217 |
| 8,315,256 | B2 | 11/2012 | Leong et al. | |
| 2002/0093954 | A1 * | 7/2002 | Weil et al. | 370/389 |
| 2005/0201273 | A1 * | 9/2005 | Shimizu | 370/216 |
| 2008/0225695 | A1 * | 9/2008 | Balus et al. | 370/216 |
| 2010/0080226 | A1 * | 4/2010 | Khalid et al. | 370/392 |
| 2010/0119240 | A1 * | 5/2010 | Feng | 398/202 |

* cited by examiner

*Primary Examiner* — Ricky Ngo
*Assistant Examiner* — Phuongchau B Nguyen
(74) *Attorney, Agent, or Firm* — Vista IP Law Group, LLP

(57) ABSTRACT

A network switch apparatus includes a first network port, a second network port, a first inline port, a second inline port, wherein the first and second inline ports are for communication with a pass-through device, a packet switch, and a by-pass device configured to operate in a first mode of operation, wherein in the first mode of operation, the by-pass device is configured to pass a first packet received at the first network port to the packet switch. The by-pass device is configured to switch from the first mode of operation to a second mode of operation upon an occurrence of a condition, and wherein in the second mode of operation, the by-pass device is configured to transmit a second packet received at the first network port to the second network port without passing the second packet to the packet switch.

49 Claims, 12 Drawing Sheets

NETWORK SWITCH WITH BY-PASS TAP

FIELD

This application relates generally to network switch devices, and more specifically, to network switch devices that have packet monitoring functions.

BACKGROUND

Network switches have been used to forward packets. Some network switch devices, such as those commercially available from Gigamon LLC, include an inline port for allowing packets to be transmitted to an instrument, such as an intrusion prevention system (IPS), so that the packets may be analyzed and examined before being transmitted downstream to one or more nodes.

In some cases, the instrument connecting to the instrument port of the network switch device may fail, thereby preventing packets from being transmitted between two or more nodes.

Also, sometimes, the network switch itself may fail, thereby preventing packets from being transmitted between two or more nodes.

For the foregoing reasons, applicants of the subject application determine that it would be desirable to provide network switch devices with by-pass functionalities, so that failure of the instrument connecting to the instrument port and/or failure of the network switch may be addressed.

SUMMARY

In accordance with some embodiments, a network switch apparatus includes a first network port, a second network port, a first inline port, a second inline port, wherein the first and second inline ports are for communication with a pass-through device, a packet switch, and a by-pass device configured to operate in a first mode of operation, wherein in the first mode of operation, the by-pass device is configured to pass a first packet received at the first network port to the packet switch. The by-pass device is configured to switch from the first mode of operation to a second mode of operation upon an occurrence of a condition, and wherein in the second mode of operation, the by-pass device is configured to transmit a second packet received at the first network port to the second network port without passing the second packet to the packet switch.

In accordance with other embodiments, a network switch apparatus includes a first network port, a second network port, a first inline port, a second inline port, wherein the first and second inline ports are for communication with a pass-through device, a packet switch, and a by-pass device, wherein in a first mode of operation, the packet switch and the first and second inline ports are involved in packet transmission between the first and the second network ports, wherein in a second mode of operation, the first and second inline ports are not involved in the packet transmission between the first and the second network ports, and wherein in a third mode of operation, the packet switch and the first and second inline ports are not involved in the packet transmission between the first and the second network ports.

In accordance with other embodiments, a network switch apparatus includes a first network port, a second network port, a first inline port, a second inline port, wherein the first and second inline ports are for communication with a pass-through device, an instrument port for connection to a non-pass through device, and a packet switch for transmitting a packet received at the first network port to the non-pass through device via the instrument port, and to the pass through device via the first inline port.

Other and further aspects and features will be evident from reading the following detailed description of the embodiments, which are intended to illustrate, not limit, the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
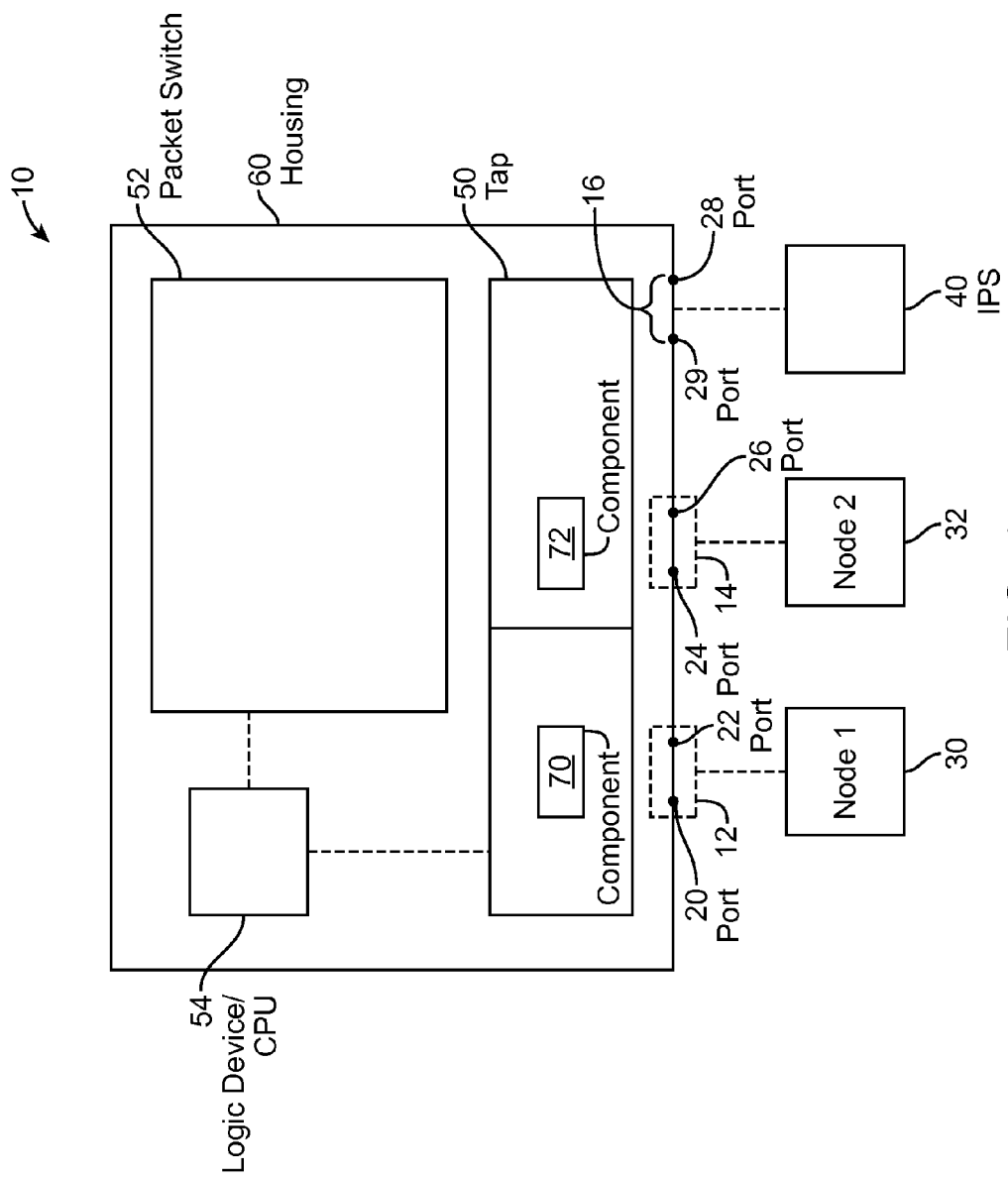
FIG. 1 illustrates a network apparatus that includes a by-pass tap in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 illustrates a device 10 in accordance with some embodiments. The device 10 is a network switch, and includes a first network port 12, a second network port 14, and a pair 16 of inline ports 28, 29. During use, the first network port 12 is communicatively coupled to a first node 30, and the second port 14 is communicatively coupled to a second node 32. The device is configured to communicate packets between the first and second nodes 30, 32 via the network ports 12, 14. The first network port 12 includes a first network in-port 20 and a first network out-port 22 for receiving and transmitting packets from and to the first node 30, respectively. Similarly, the second network port 14 includes a second network in-port 24 and a second network out-port 26 for receiving and transmitting packets from and to the second node 32, respectively. Although only two network ports 12, 14 are shown, in other embodiments, the device 10 may include more than two network ports.

Also, during use, the inline ports 28, 29 of the device 10 are communicatively coupled to an instrument 40, which is an intrusion prevention system (IPS), for transmitting and receiving packets to and from the IPS 40. It should be noted that IPS is inline and is connected to the two inline ports 28, 29 of the device 10. During use, the device 10 is configured to transmit packets to, and receive packets from, the IPS 40, wherein the packets are intended to be communicated between two nodes 30, 32. Thus, IPS is different from, and belongs to a different class of instrument from that of, sniffer, network monitoring system, application monitoring system, intrusion detection system, forensic storage system, and application security system, which can only receive packets that are intended to be communicated between nodes, and cannot transmit such packets. Although only two inline ports 28, 29 are shown, in other embodiments, the device 10 may include additional inline ports for connection to additional IPS(s). In some of the embodiments described herein, the inline port 28/29 is illustrated as transmitting packets in a certain direction. However, it should be understood that each of the inline ports 28, 29 is bi-directional, and can transmit packets to and from the IPS 40.

The device 10 also includes a by-pass tap 50, a packet switch 52 coupled to the by-pass tap 50, and a CPU 54. The by-pass tap 50 and the packet switch 52 may be contained in a housing 60. In some cases, the device 10 is provided as a single unit that allows the device 10 to be deployed at a single point along a communication path. In the illustrated embodiments, the packet switch 52 is configured to receive packets from nodes 30, 32 via the network ports 12, 14, and process the packets in accordance with a predefined scheme. For example, the packet switch 52 may pass packets received from one or more nodes to one or more instruments that are connected to respective instrument port(s) (not shown). The by-pass tap 50 is configured to transmit packets directly between the nodes 30, 32, pass packets to the instrument 40, and/or pass packets to the network switch 50 in accordance with a predefined scheme, as described herein. The by-pass tap 50 includes a plurality of mechanical relay 70, 72 for alternatively routing packets directly to node(s), or to the packet switch 52 and the instrument 40, as described herein. In some embodiments, the components 70, 72 may be parts of a mechanical relay system configured (e.g., designed, built, etc.) for performing the functions described herein. The CPU 54 is configured to process information that may be used in the operation of the by-pass tap 50 and/or the packet switch 52.

In some embodiments, the network ports 12, 14 and the inline ports 28, 29 may be parts of the by-pass tap 50. In other embodiments, the network ports 12, 14 and the inline ports 28, 29 may be parts of the packet switch 52.

Figure 2:
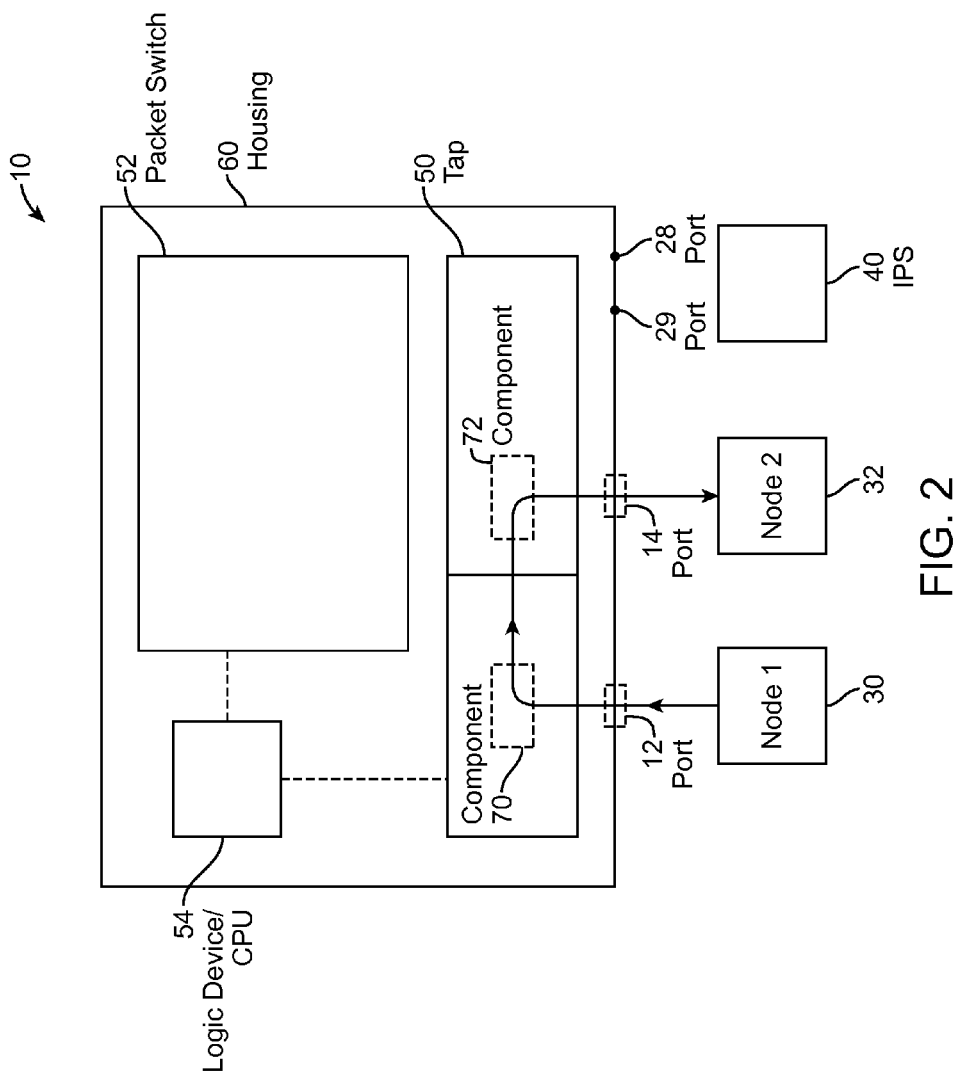
FIG. 2 illustrates a first mode of operation of the device of FIG. 1.

In the illustrated embodiments, the device 10 is configured to have at least four modes of operation. In the first mode of operation, the device 10 is initially powered on, and the by-pass component 50 is configured to directly transmit packets between the first and second nodes 30, 32 without passing the packets to the packet switch 52 and the inline ports 28, 29 (FIG. 2). This allows the nodes 30, 32 to communicate with each other while the device 10 is in the relay state. In the relay state, the relays 70, 72 are connected together to form a physical path connecting ports 12, 14. Although one path representing communication from node 30 to node 32 is shown in the figure, it should be understood that packets can be communicated from node 32 to node 30 using the in-port 24 and out-port 22.

Figure 3:
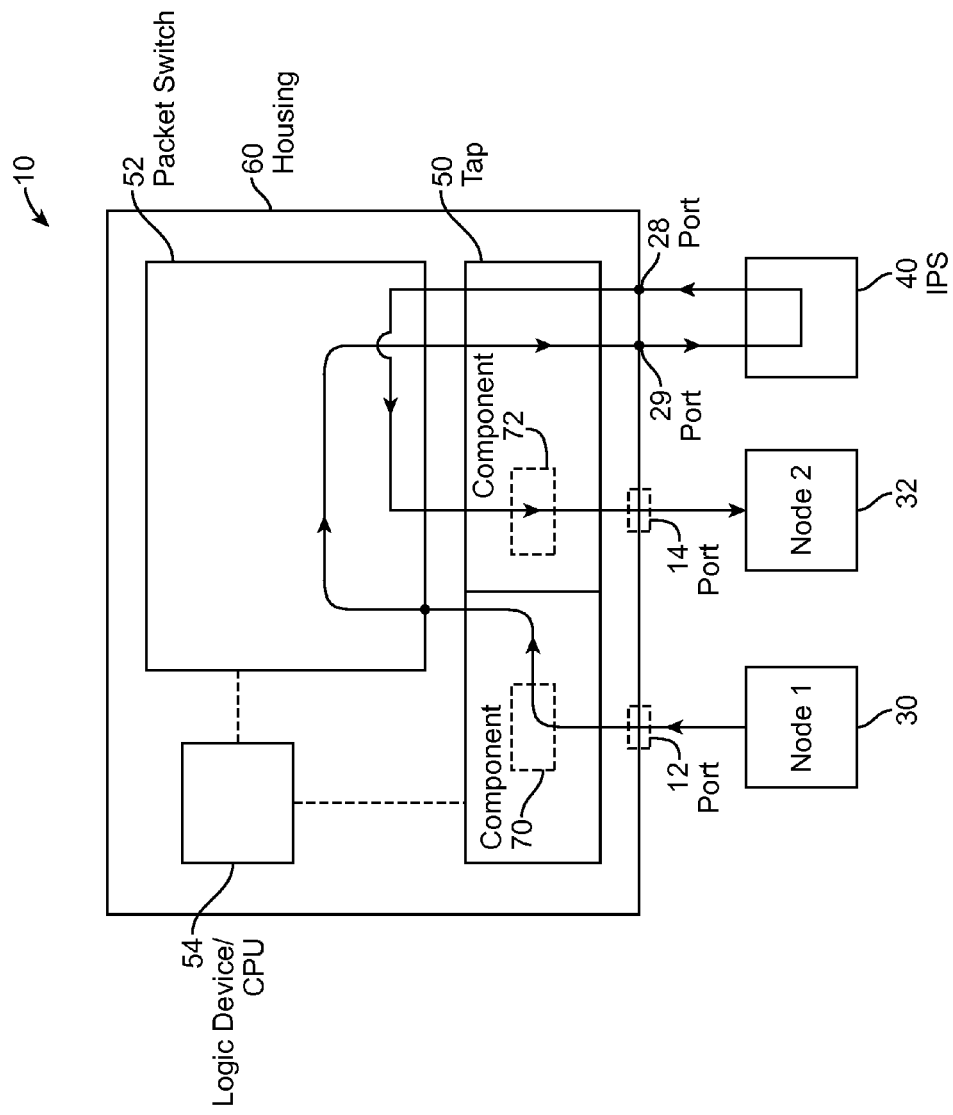
FIG. 3 illustrates a second mode of operation of the device of FIG. 1.

After the device 10 is powered up, the device 10 then operates in a normal operational state (i.e., the inline by-pass state) (FIG. 3). In some embodiments, to transition from the relay state to the inline by-pass state, the relay 70, 72 need to be opened. This can be a user-configurable operation or automatic. In the second mode of operation (the inline by-pass state), the by-pass tap 50 is configured to receive packets from the first node 30, and pass the packets to the packet switch 52 so that the packet switch 52 can process the packets in the pre-defined scheme. In the second mode of operation, the by-pass tap 50 is also configured to receive processed packets from the packet switch 52, and pass the packets to the inline port 29 so that the instrument 40 coupled thereto may process the packets. The processed packets from the instrument 40 are then transmitted via the inline port 28 back to the by-pass tap 50, which forwards the packets to the packet switch 52. The packet switch 52 processes the packets received from the instrument 40, and transmits them to the second node 32 via the second port 14 (and/or other node(s) via other port(s)). In other embodiments, the packets may be transmitted from the node 32 to the node 30 (and/or other node(s) via other port(s)). In such cases, the direction of transmission described previously may be reversed.

Also, in other embodiments, packets being transmitted from the instrument 40 to the device 10 may not go through the by-pass tap 50. For example, packets can enter a first network port 12, through the packet switch 52, to some non-by-pass tap port, then through IPS 40, to some other non-by-pass tap port, then to the packet switch 52, and out of the second network port 12. So physically the packets entering the second network port 12 do not pass through the by-pass tap 50.

Although one path representing communication from node 30 to node 32 is shown in FIG. 3, it should be understood that packets can be communicated from node 32 to node 30 in a reverse direction—i.e., using the in-port 24 and out-port 22.

Figure 4:
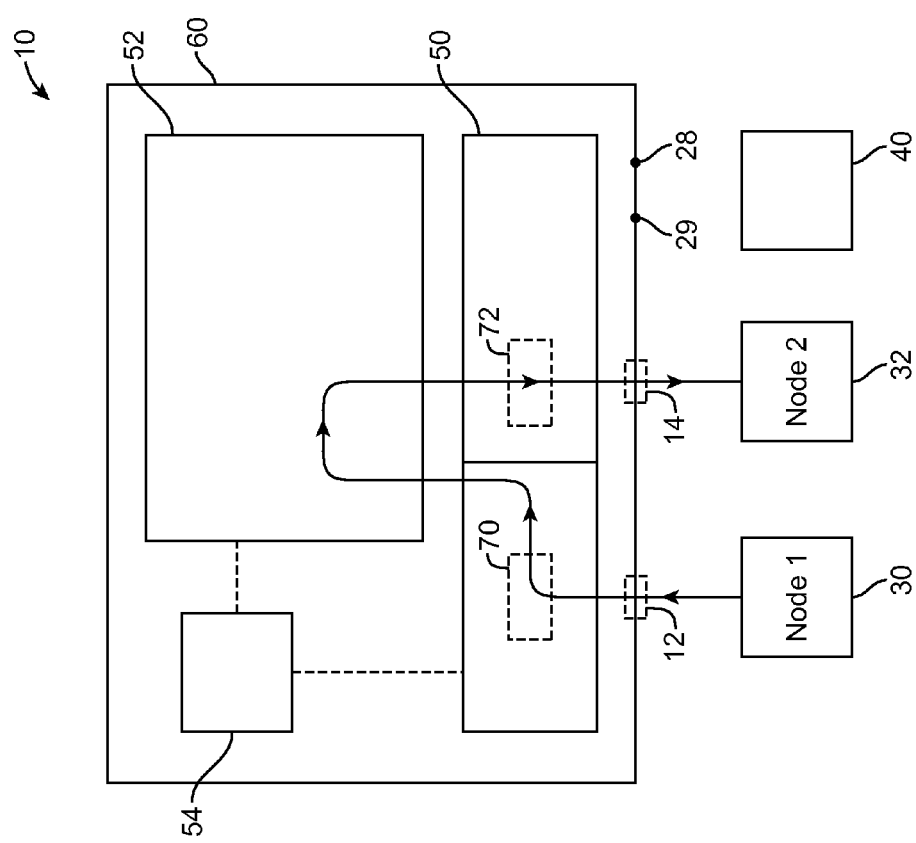
FIG. 4 illustrates a third mode of operation of the device of FIG. 1.

In some cases, if the instrument 40 connecting to the inline port fails, but the packet switch 52 remains functional, the packet switch 52 may be configured to transmit received packets from node 30 directly to node 32 (and/or from node 32 to node 30) without involving the intrusion prevention system 40 (FIG. 4). In this third mode (repeat mode) of operation, the packet switch 52 is functioning like an active by-pass switch. Using the packet switch 52 to transition to the repeat mode is advantageous because nodes 30, 32 will not see any link down event. In particular, using the packet switch 52 to link up the nodes 30, 32 in the event of a failure by the instrument 40 is more advantageous than using a passive by-pass switch. This is because if a passive by-pass switch is used to link up the nodes 30, 32, the nodes 30, 32 may see a link down for a very short duration (e.g., range of msec). The problem of having node 30 and node 32 seeing a link down event is that, if node 30 or node 32 participates in the Spanning Tree Protocol (or the Rapid Spanning Tree Protocol), then the link down event may trigger a Spanning Tree Protocol re-configuration, which is not desirable.

Various techniques may be used by the device 10 to determine if the instrument 40 fails. For example, in some embodiments, the CPU 54 may analyze packet history or port statistics and determines if a condition representing failure of the instrument 40 or error by the instrument 40 has occurred. In some embodiments, packet history may include the state of a traffic flow. For example, if there are a number of flows currently open up and all of a sudden there is no packet, then such condition may indicate that something is wrong. For example, the IPS 40 may have hung (yet the links to the inline ports may still be functional). Alternatively, or additionally, the CPU 54 may periodically check link, packet state, and/or prescribed protocol to ensure that the instrument 40 is working properly. In some embodiments, if the packet switch 52 detects that the inline instrument 40 fails (either through the links, protocols, etc.), it will automatically terminate the original connections between ports 20, 29 and between ports 26, 28. The packet switch 52 will then automatically establish a new connection between ports 20, 26 and ports 22, 24. The connections can be VLAN connections, or can be mirroring connections, or can be established by other features of the packet switch 52.

Although one path representing communication from node 30 to node 32 is shown in FIG. 4, it should be understood that packets can be communicated from node 32 to node 30 in a reverse direction—i.e., using the in-port 24 and out-port 22.

Figure 5:
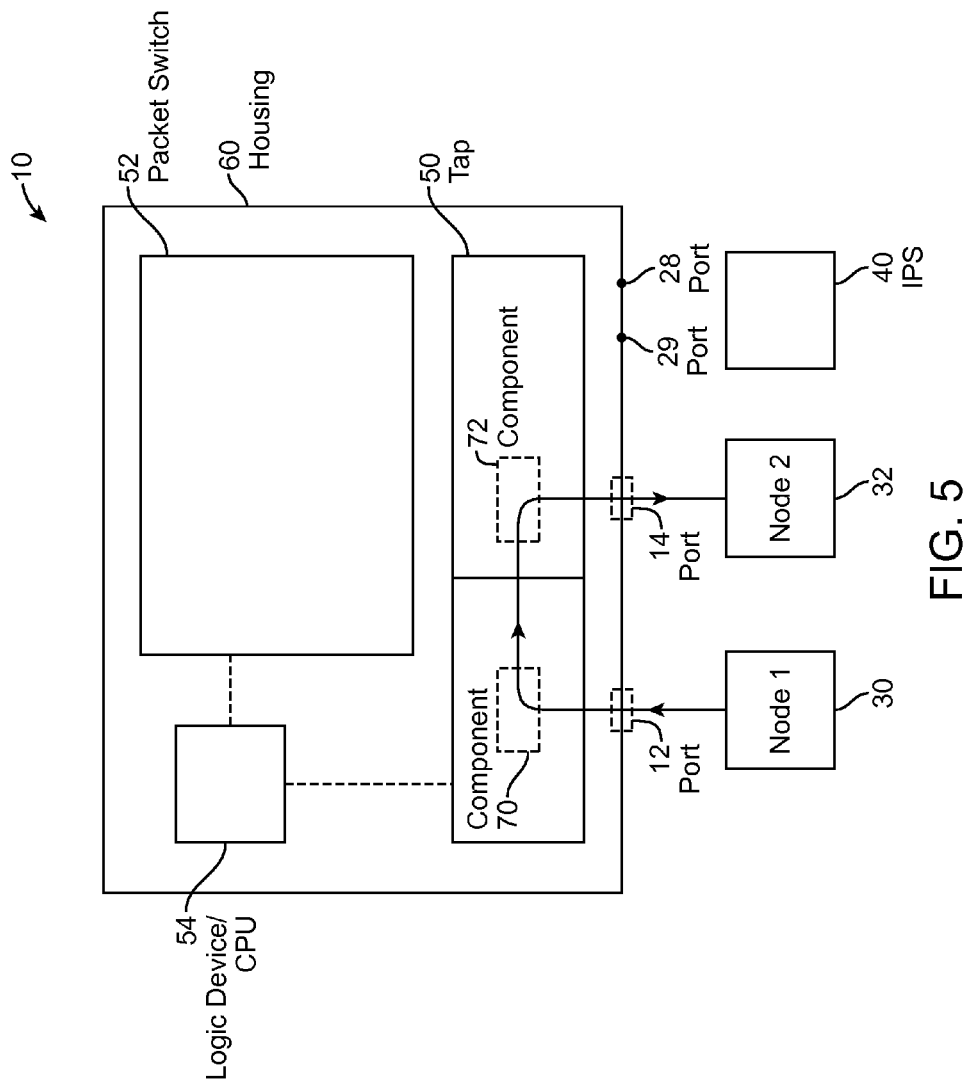
FIG. 5 illustrates a fourth mode of operation of the device of FIG. 1.

In other cases, in the fourth mode of operation, if the packet switch 52 fails, the by-pass tap 50 is configured to directly transmit packets from the first node 30 to the second node 32 (and/or from the second node 32 to the first node 30) without involving the packet switch 52 and the instrument 40 that is coupled to the inline ports 28, 29 (FIG. 5). For example, the relay components 70, 72 of the by-pass component 50 may close to form a communication link between the nodes 30, 32, while terminating the transmission link between the by-pass component 50 and the packet switch 52. The mechanical relays 70, 72 are configured to connect the paths within the device 10 such that the end nodes 30, 32 can directly communicate with each other as if they are seeing a straight wire. In some embodiments, if there are multiple in-ports and multiple out-ports, and each in-port maps to one unique out-port, then the multiple relays are configured to close multiple such paths within the device 10 such that they form multiple direct electrical connection within the device 10 for allowing the multiple nodes to communicate directly with each other. The advantage of using the mechanical relay to implement the by-pass feature is that if the packet switch 52 fails (e.g., due to power outage, error, etc.), the communication link between the nodes 30, 32 would remain on. Although one path representing communication from node 30 to node 32 is shown in the figure, it should be understood that packets can be communicated from node 32 to node 30 in the opposite direction, i.e., using the in-port 24 and out-port 22.

Various techniques may be used to implement that above by-pass feature. In some embodiments, the device 10 may include a logic device 18 (shown in FIG. 1) (e.g., CPLD, FPGA, etc.) that is coupled to the mechanical relay. In such cases, the CPU 54 may be configured to periodically send a watchdog signal to the logic device. The logic device is configured to maintain a current so that the mechanical relay is constantly at an active state as long as the watchdog signal is received by the logic device periodically. If the packet switch 52 or the CPU 54 fails, the CPU 54 will stop transmitting the watchdog signal to the logic device. In such cases, the logic device will stop transmitting the current to the mechanical relay, resulting in the mechanical relay switching from the active state to the passive state. In the passive state, the mechanical relay forms a bridge to directly connect the nodes 30, 32. In some embodiments, in the event of a power failure, the logic device will also stop transmitting the current to the mechanical relay, thereby also resulting in the mechanical relay forming a bridge to directly connect the nodes 30, 32.

In one implementation of the above described embodiments, the open and/or close state of the mechanical relays is controlled by a CPLD. The CPLD may be any active logic device/module. The CPLD has a register that expects the CPU to periodically write to it. If there is a power outage or if the CPU dies, then nothing is written to this register. After a prescribed time (e.g., in the milliseconds) has passed, the CPLD will close the mechanical relays. In some embodiments, the CPLD is a component within the device 10. In other embodiments, the CPLD may be a part of the CPU or the relay system.

Implementing the by-pass tap 50 using mechanical relays allows the by-pass tap 50 to operate like a passive by-pass tap. This is advantageous because when there is a failure of the packet switch 52, such as no power to the packet switch 52 (or to the device 10), the relays of the by-pass tap 50 readily close themselves to thereby maintain the link between nodes. Thus, maintaining of the link between the nodes does not require any power be provided to the by-pass tap 50.

Figure 6A:
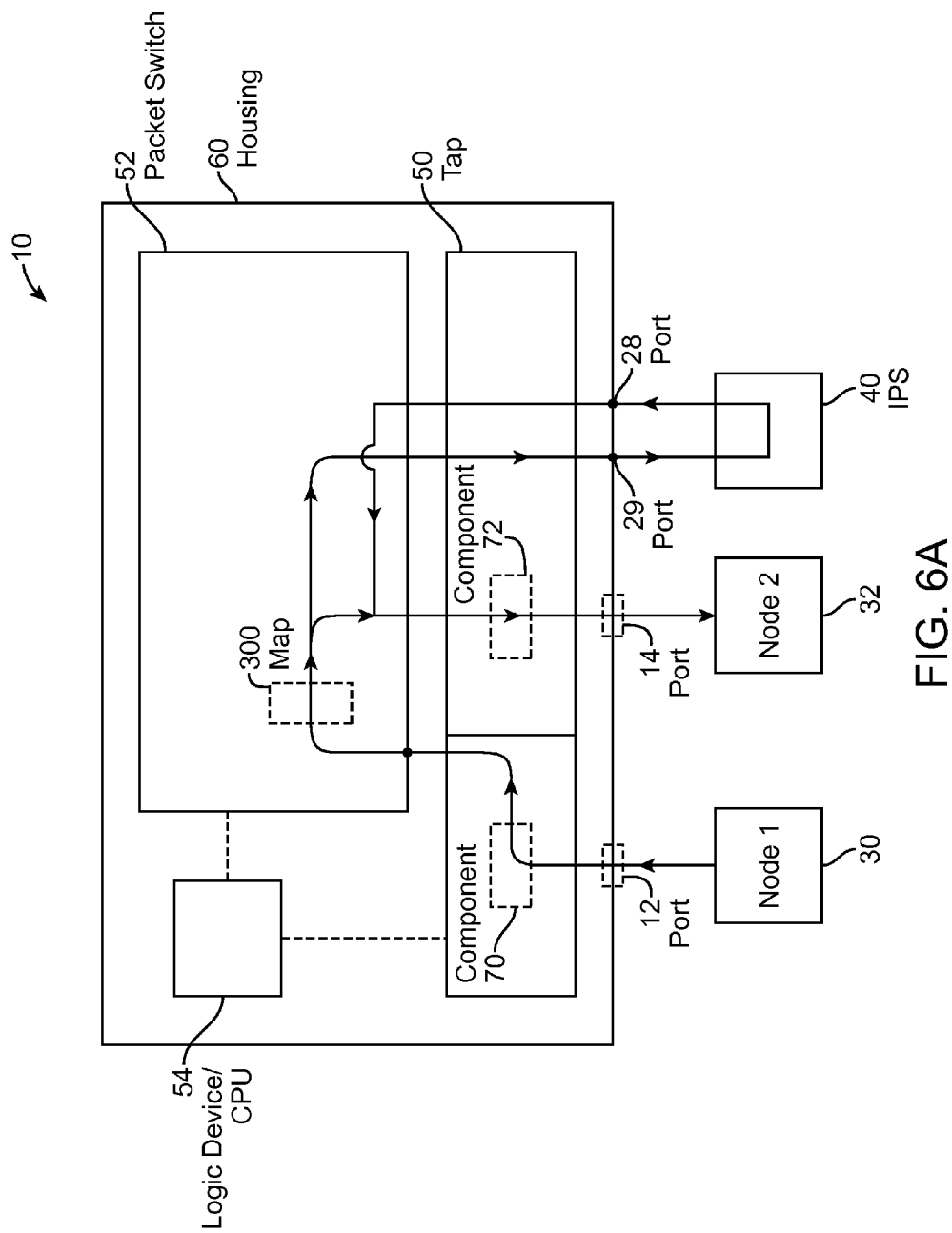
FIGS. 6A-6C illustrate variations of the device of FIG. 1 that include one or more filter maps in accordance with some embodiments.

In other embodiments, the device 10 may be used to handle higher bandwidth traffic (such as 10G, 40G or 100G traffic) while preventing an intrusion prevention system 40 from randomly dropping packets. Existing intrusion prevention systems may not be able to handle such higher bandwidth traffic. For example, they may be able to handle only a few Gbps worth of bandwidth. As a result, existing intrusion prevention systems may randomly drop packets, which is undesirable. In some embodiments, the device 10 may include one or more maps configured to selectively pass (filter) certain packets to the inline port 28/29 (FIG. 6A). For example, the device 10 may include a first map 300 for filtering packets received from the first network port 12, wherein the first map 300 is configured so that only certain type(s) of traffic, such as, all web traffic, will be directed to the intrusion prevention system 40 via the inline port 29. Since in the example, the intrusion prevention system 40 only needs to handle web traffic, it may be able to handle the web traffic communicated via the 10G (or higher) network. Note that the rest of the traffic will be forwarded to the node 32 directly (as indicated by the dashed arrow). In other embodiments, the map may be configured so that each instrument coupled to certain inline ports is dedicated to handle two or more types of network traffic, but not all of the traffic, that is transmitted to the device 10.

Figure 6B:
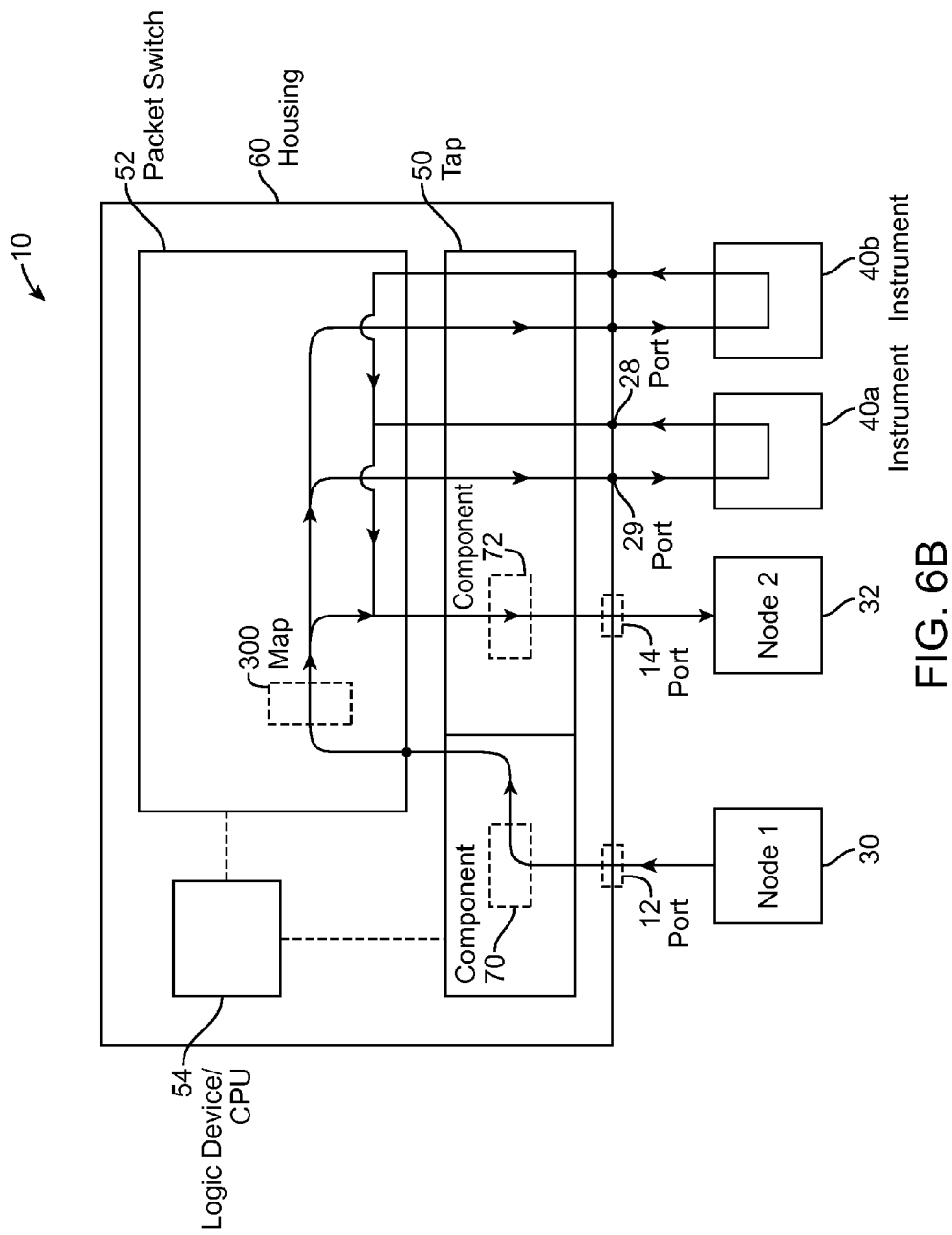

Also, in other embodiments, the device 10 may include additional inline ports that may be coupled to additional intrusion prevention system(s) 40 (e.g., systems 40a, 40b in FIG. 6B). In such cases, the map(s) may be configured to pass packets to the instrument(s) 40 in accordance with a pre-defined scheme. For example, the map may be configured to pass web traffic to one or more instruments 40a, and to pass email traffic to another one or more instruments 40b. Such configuration allows 10G (or higher) traffic to be distributed to different intrusion prevention systems 40, allowing the systems to handle 10G (or higher) traffic without dropping any packets. This way, multiple intrusion prevention system 40 together can handle all of the 10G (or higher) traffic. By splitting the traffic into multiple inline tools, and then collecting them back again for delivery to the corresponding node, the device 10 allows the complete traffic to be examined and each inline tool 40 can work within its capacity.

Figure 6C:
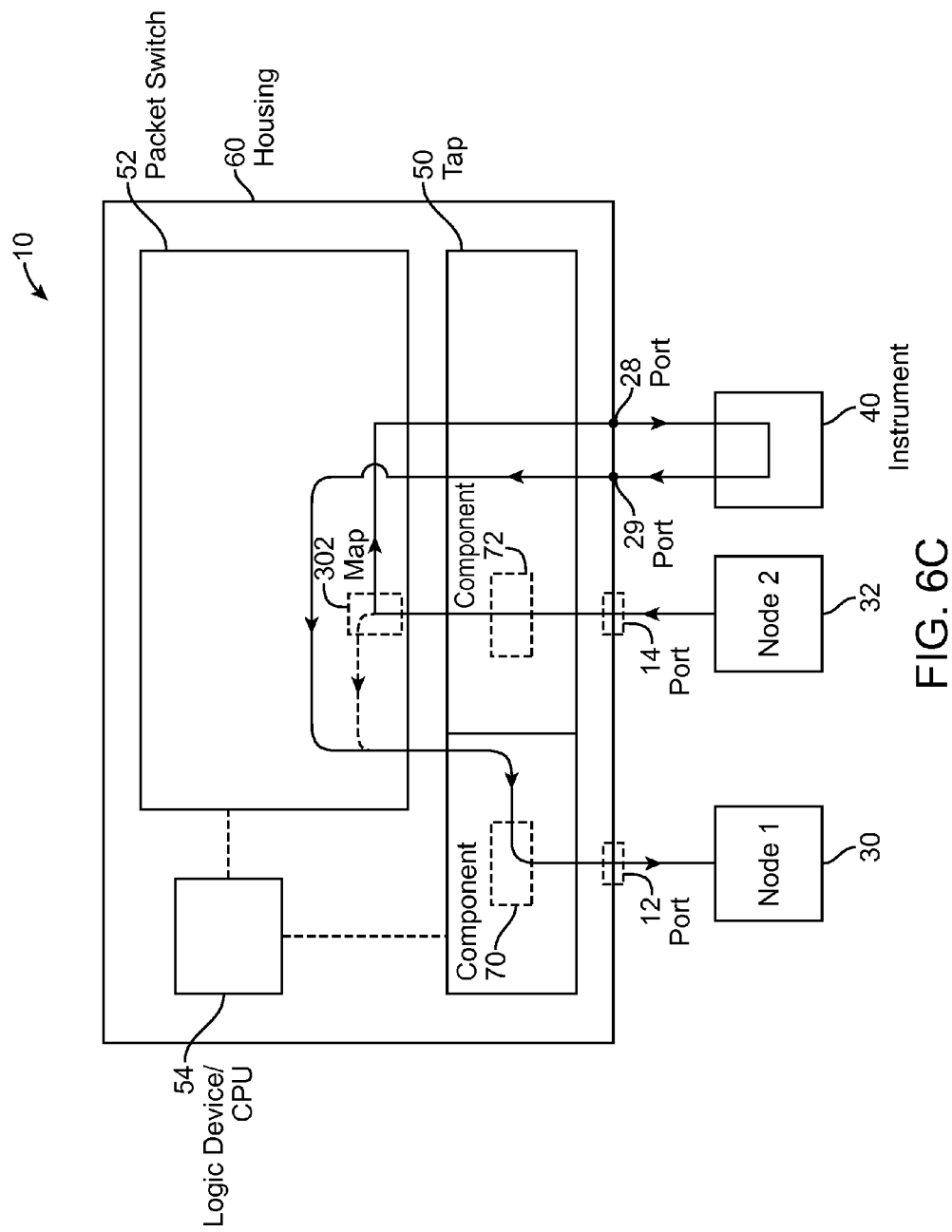

In some embodiments, in addition to the first map 300, the device 10 may also include a second map 302 for filtering packets received from the second network port 14 (FIG. 6C). Similar to the first map 300, the second map 302 is configured so that only certain type(s) of traffic, such as, all web traffic, will be directed from the second node 32 to the intrusion prevention system 40 via the inline port 28. In other embodiments, the second map 302 may be configured so that each pair of inline ports is dedicated to handle two or more types of network traffic, but not all of the traffic, that is transmitted to the device 10 from the second node 32.

In any of the embodiments described herein, the map(s) may be stored in a medium, such as a memory, located in the device 10, wherein the medium is communicatively coupled to the packet switch 52 for allowing access by the packet switch 52. In some cases, the map(s) is user-configurable, which allows a user, such as an administrator, to prescribe which port(s) is associated with which type(s) of traffic.

Figure 7A:
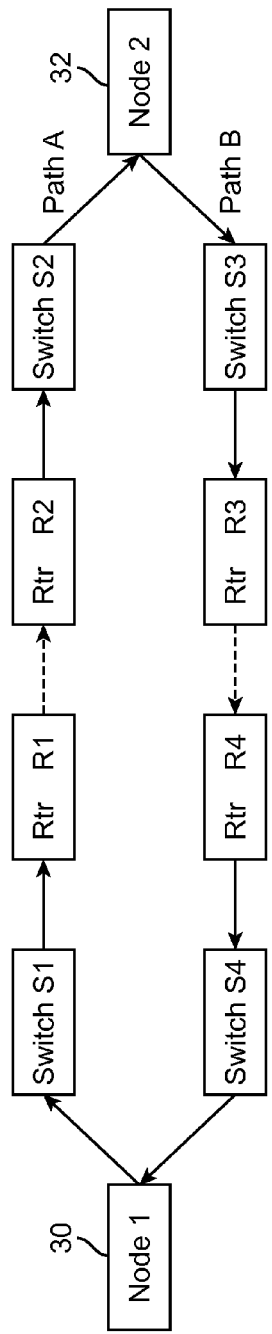
FIG. 7A illustrates asymmetric links between two nodes.
Figure 7B:
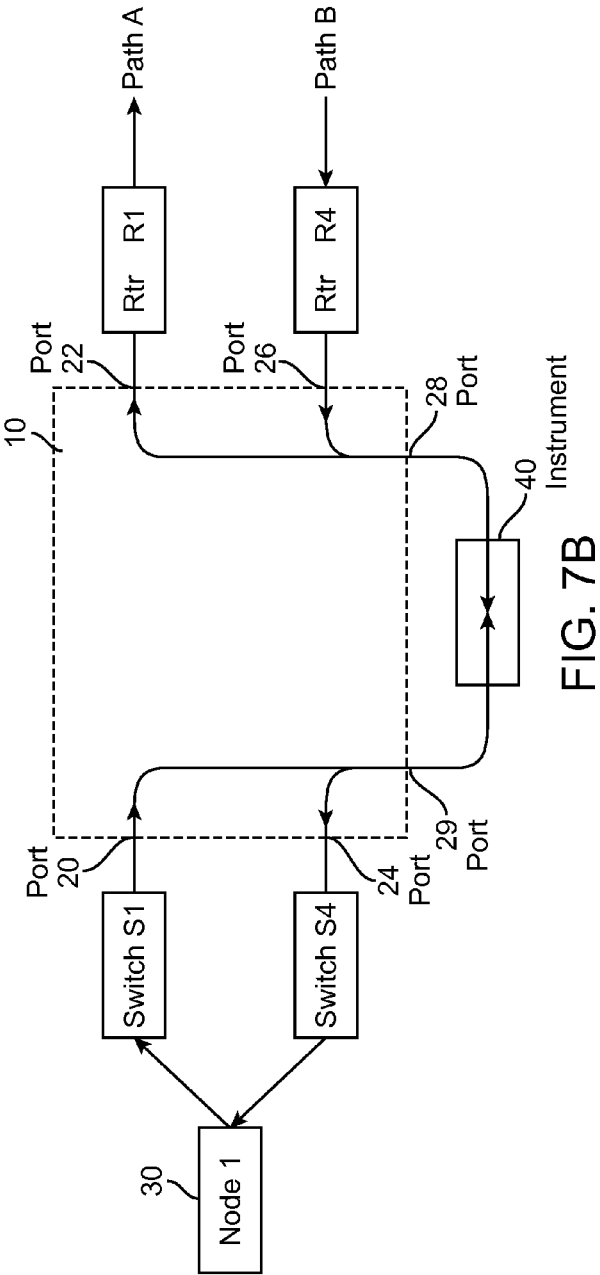
FIG. 7B illustrates embodiments of the device of FIG. 1 being used to transmit packets via asymmetric links.

In some embodiments, the device 10 described herein may be used for asymmetric routing. FIG. 7A illustrates an example of asymmetric links between the nodes 30, 32. In asymmetric communication, the connection between two nodes 30, 32 may be using different physical paths. In the illustrated example, communication from node 30 to node 32 will go through switch S1, router R1, router R2, and switch S2. However, communication from node 32 to node 30 will go though switch S3, router R3, router R4, and switch S4. If an intrusion prevention system is sitting inline in one path only, then it has limited visibility. In some embodiments, the device 10 is configured to aggregate the traffic from both links to the same intrusion prevention system, so that it has complete visibility for both links in the asymmetric communication (FIG. 7B). In the illustrated embodiments, the device 10 is configured to label the packets exiting the inline port 28/29 (i.e., packets going to the intrusion prevention system(s)). The label is used to keep track which link it is coming from to the intrusion prevention system 40, so that the intrusion prevention system 40 can distinguish which packet comes from which direction. The intrusion prevention system 40 analyzes the network traffic from both directions, makes pass/drop decisions, and transmits the packets back to the device 10. After receiving the packets back from the intrusion prevention system 40, the device 10 is configured to remove the label, and send the packets back to the correct path. Such labeling may be implemented using a special VLAN tag, or a proprietary label added by a daughter card (e.g., a proprietary label that is understood by the IPS).

Figure 7C:
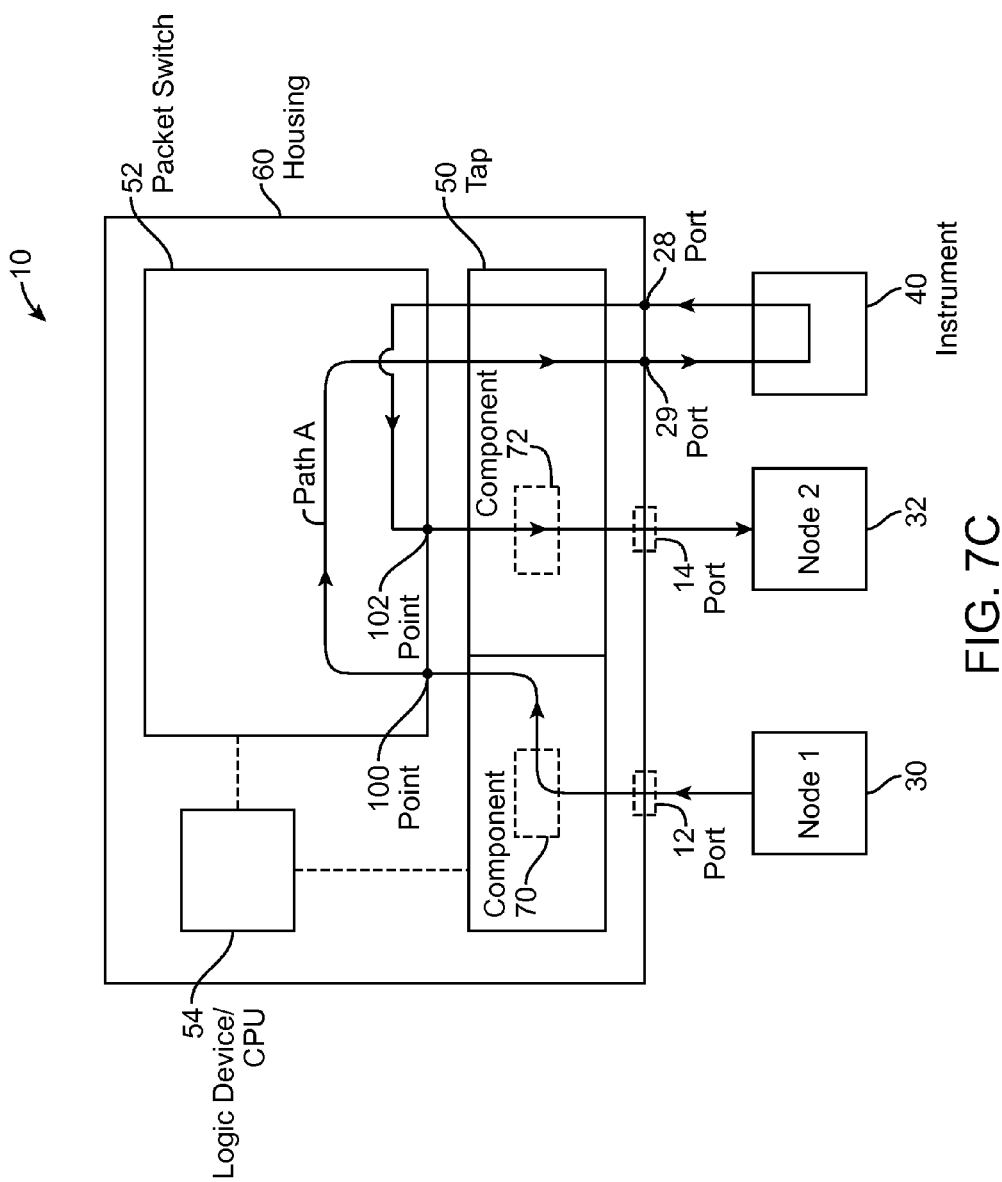
FIGS. 7C and 7D illustrate schematically how adding and removal of label(s) are implemented in accordance with some embodiments.
Figure 7D:
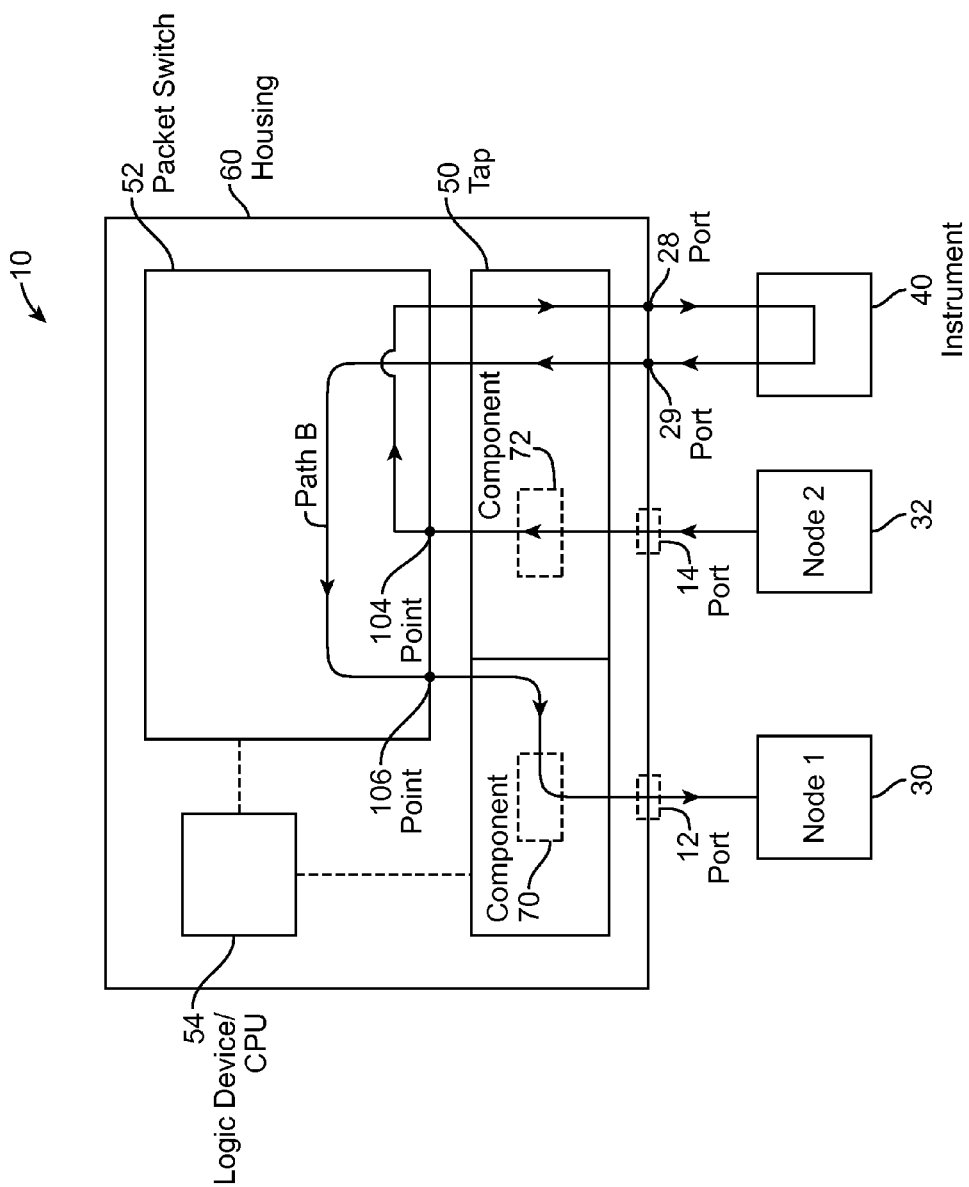

FIG. 7C illustrates schematically how the adding and removal of labels are implemented in accordance with some embodiments. As shown in the figure, the adding of label(s) for path A may occur at point 100 or anywhere after the packet is transmitted to the packet switch 52. The removal of label(s) for path A may occur at point 102 or anywhere before the packet is transmitted from the packet switch 52. Similarly, as shown in FIG. 7D, the adding of label(s) for path B may occur at point 104 or anywhere after the packet is transmitted to the packet switch 52. The removal of label(s) for path B may occur at point 106 or anywhere before the packet is transmitted from the packet switch 52. As illustrated in the above embodiments, by configuring the device 10 to add a unique label to the packets from each of the asymmetric links, the IPS 40 can distinguish between these packets from the different links. When these packets go back to the device 10 from the IPS 40, the device 10 then removes these labels before sending them to the corresponding node(s).

In any of the embodiments described herein, the device 10 may be optically based. In such cases, the device 10 is configured to receive network traffic in the form of optical signals, and process the network traffic in accordance with embodiments described herein. Different techniques may be used to implement the by-pass tap 50 in different embodiments. In some embodiments, one can use a relay that has a rotating mirror. Such configuration works in a similar manner as the relay for the copper media, except that each relay component becomes a mirror. In other embodiments, the optical by-pass tap 50 may be implemented using micro-electro-mechanical ("MEM") mirrors. It has the same mechanism as the rotating mirrors except it is operating at a much smaller size.

In any of the embodiments, the packet switch 52 may be any network switching device that provides packet routing and/or monitoring functions. In some embodiments, the packet switch 52 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a sniffer, a network monitoring system, an application monitoring system, an intrusion detection system, a forensic storage system, an application security system, etc., which are not pass through devices (i.e., they can only receive packets intended to be communicated between two nodes 30, 32, and cannot transmit such packets downstream). In other embodiments, the packet switch 52 may be configured such that the packets may be transmitted in a one-to-many configuration (i.e., from one network port to multiple instrument ports). In other embodiments, the packet switch 52 may be configured such that the packets may be transmitted in a many-to-many configuration (i.e., from multiple network ports to multiple instrument ports). In further embodiments, the packet switch 52 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the device 10 so that the packets (or certain types of packets) are routed according to any one of these configurations.

In some embodiments, the packet movement configuration is predetermined such that when the device 10 receives the packets, the device 10 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of packet switch 52 that may be used with the device 10 include any of the commercially available network switch devices, such as GigaVUE™, that is available at Gigamon LLC.

Other examples of packet switch 52 that may be used with the device 10 are described in U.S. patent application Ser. Nos. 12/148,481, 12/255,561, 11/123,273, 11/123,465, and 11/123,377, the entire disclosure of all of which is expressly incorporated by reference herein.

In accordance with some embodiments, the packet switch 52 may have the functionalities of a conventional packet switch except that it provides visibility into various parts of a network. Thus, embodiments of the packet switch 52 may operate like a conventional managed packet switch, but providing packet monitoring function. This is accomplished by configuring the packet switch to operate as a circuit switch under certain circumstances. The configuring of the managed packet switch is performed by utilizing the CPU interface of the switch to modify appropriate registers in the switch to allow for the desired operation.

It should be noted that the packet switch 52 that may be used with the device 10 is not limited to the examples described above, and that other packet switches 52 with different configurations may be used as well. For example, in other embodiments, the packet switch 52 may not provide any monitoring function. Instead, the packet switch 52 may be any conventional network switch that provides routing function.

Figure 8:
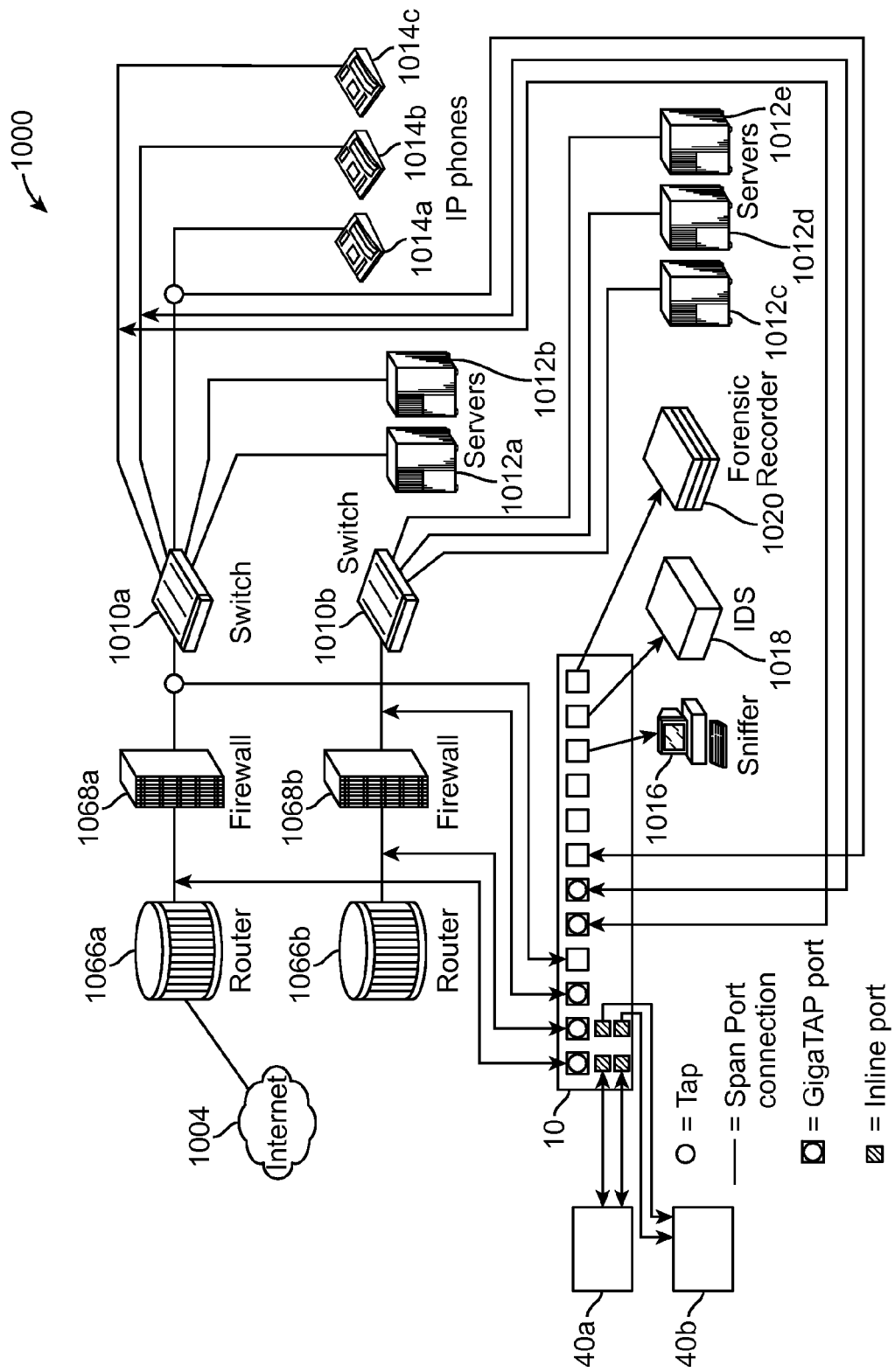
FIG. 8 illustrates a deployment of the device of FIG. 1 in accordance with some embodiments.

FIG. 8 shows the deployment of the device 10 in a network environment 1000 in accordance with some embodiments. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "non-pass through instruments") are coupled to the device 10. As illustrated in FIG. 8, there is a reduction on the number of non-pass through instruments in this deployment as compared to a conventional configuration (in which there may be one or more non-pass through instruments between router 1066a and firewall 1068a, one or more non-pass through instruments between firewall 1068a and switch 1010a, one or more non-pass through instruments between router 1066b and firewall 1068b, and firewall 1068b and switch 1010b) because the same non-pass through instruments can now access information anywhere in the network environment 1000 through the device 10. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014a-c can be easily configured to be sent to an IDS 1018. It is also possible that traffic inside a particular IP phone 1014a-c connection can be sent to a sniffer 1016, and Intrusion Detection System 1018 and a forensic recorder 1020 simultaneously via the one-to-many function. The by-pass tap 50 of the device 10 described herein provides fault-tolerant packet transmission capability. If the network switch of the device 10 fails to function for whatever reason, or if any of the pass through instruments 40 fails for whatever reason, the device 10 can maintain connectivity of the network attached to them.

In some embodiments, when using the device 10, one or more non-pass through instruments (such as IDS, sniffer, forensic recorder, etc.) may be connected to instrument port (s), and one or more pass through instruments (e.g., IPS 40) may be connected to respective pairs of inline tool ports. Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the device 10, the device 10 can compare whether the IDS or the IPS sees more threats, and/or can have a redundant protection such that if the IPS misses any threat, the IDS may pick it up.

It should be noted that in this specification, the terms "first," " "second," "third," and "fourth" are used to indicate different things, features, or packet, etc., and are not used to indicate order or priority. For example, the terms "first packet" and "second packet" are used to indicate that there are two different packets, and do not mean that the first packet is the packet first in order. Similarly, the terms "first mode of operation," "second mode of operation," "third mode of operation," etc., and similar terms are used to indicate that there are different modes of operation. Thus, for example, a mode of operation described as "first mode" in one embodiment may be a "second mode," or a "third mode," etc., in other embodiments, depending on the context in which the mode of operation is described.

Also, when a "packet" is described in this application, it should be understood that it may refer to the original packet that is transmitted from a node, or a copy of it.

Although particular embodiments have been shown and described, it will be understood that they are not intended to limit the present inventions, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed is:

1. A network switch apparatus, comprising:
a housing;
a first network port;
a second network port;
a first inline port;
a second inline port, wherein the first and second inline ports are for communication with a pass-through device;
a packet switch; and
a by-pass device configured to operate in a first mode of operation, wherein in the first mode of operation, the by-pass device is configured to pass a first packet received at the first network port to the packet switch;
wherein the by-pass device is configured to switch from the first mode of operation to a second mode of operation upon an occurrence of a condition, and wherein in the second mode of operation, the by-pass device is configured to transmit a second packet received at the first network port to the second network port without passing the second packet to the packet switch;
wherein the network switch apparatus is a single device, and wherein the housing, the first network port, the second network port, the first inline port, the second inline port, the packet switch, and the by-pass device are parts of the single device;
wherein the network switch apparatus further comprises a logic device for detecting the condition that triggers the second mode of operation; and wherein the logic device comprises a register, wherein a central-processing-unit (CPU) periodically writes to the register, and the logic device is configured to close a mechanical relay to connect the first and second network ports when the logic device determines that nothing is written to the register for a prescribed period.

2. The network switch apparatus of claim 1, wherein the condition that triggers the second mode of operation comprises a failure of the packet switch.

3. The network switch apparatus of claim 1, wherein the packet switch has a first mode of operation in which the packet switch passes the first packet to the first inline port, and a second mode of operation in which the packet switch does not pass the first packet to the first inline port.

4. The network switch apparatus of claim 3, wherein packet switch is configured to switch from its first mode of operation to its second mode of operation upon a detection of a failure of the pass-through device.

5. The network switch apparatus of claim 4, wherein the logic device is configured for detecting the failure of the pass-through device.

6. The network switch apparatus of claim 5, wherein the logic device is configured to detect the failure of the pass-through device by analyzing packet history.

7. The network switch apparatus of claim 5, wherein the logic device is configured to detect the failure of the pass-through device by analyzing port statistics.

8. The network switch apparatus of claim 1, wherein the by-pass device comprises the mechanical relay.

9. The network switch apparatus of claim 8, wherein the mechanical relay has a relay component that electrically connects the first and the second network ports to form a communication path, and disconnects the packet switch from the communication path when the by-pass device is in its second mode of operation.

10. The network switch apparatus of claim 9, wherein the relay component is configured to directly electrically connect the first and the second network ports when there is no power applied to the by-pass device.

11. The network switch apparatus of claim 1, wherein the by-pass device is optical based.

12. The network switch apparatus of claim 1, further comprising a filter for filtering additional packets received from the first network port such that a first subset of the additional packets is passed to the first inline port, while a second subset of the additional packets is passed to the second network port.

13. The network switch apparatus of claim 1, further comprising additional inline ports for coupling to one or more additional pass-through devices, and a filter configured to pass additional packets received from the first network port to the pass-through device and the one or more additional pass-through devices such that all of the pass-through devices collectively can handle at least 10 Gigabytes (10G) communication without a need to randomly drop packets.

14. The network switch apparatus of claim 1, wherein the pass-through device comprises an intrusion prevention system.

15. The network switch of claim 1, wherein the network switch is configured to add a label to the first packet before passing the first packet to the first inline port, and remove the label from the first packet before transmitting the first packet to the second network port.

16. The network switch apparatus of claim 1, further comprising a housing for containing the by-pass device and the packet switch.

17. The network switch apparatus of claim 1, further comprising an instrument port for connection to a non-pass through device.

18. The network switch apparatus of claim 17, wherein the non-pass through device comprises a sniffer, an intrusion detection system (IDS), or a forensic recorder, and the pass through device comprises an intrusion prevention system (IPS), and wherein the network switch apparatus further comprises a logic device for comparing performance of the non-pass through device and performance of the pass through device.

19. The network switch apparatus of claim 1, wherein the single device is configured for deployment at a geographical location.

20. The network switch apparatus of claim 1, wherein the first network port, the second network port, the first inline port, and the second inline port are at one or more sides of the housing.

21. A network switch apparatus, comprising:
a housing;
a first network port;
a second network port;
a first inline port;
a second inline port, wherein the first and second inline ports are for communication with a pass-through device;
a packet switch in the housing; and
a by-pass device in the housing;
wherein in a first mode of operation, the packet switch and the first and second inline ports are involved in packet transmission between the first and the second network ports;
wherein in a second mode of operation, the packet switch is involved, and the first and second inline ports are not involved, in the packet transmission between the first and the second network ports;
wherein in a third mode of operation, the packet switch and the first and second inline ports are not involved in the packet transmission between the first and the second network ports;
wherein the network switch apparatus is a single device, and wherein the housing, the first network port, the second network port, the first inline port, the second inline port, the packet switch, and the by-pass device are parts of the single device;
wherein the first mode of operation is switched to the third mode of operation when a failure of the network switch has occurred; and
wherein the network switch apparatus further comprises a logic device for detecting the failure of the network switch or a central-processing-unit (CPU) that is coupled to the logic device.

22. The network switch apparatus of claim 21, wherein the first mode of operation is switched to the second mode of operation when a failure of the pass-through device has occurred.

23. The network switch apparatus of claim 22, wherein the logic device is also configured for detecting the failure of the pass-through device.

24. The network switch apparatus of claim 23, wherein the logic device is configured to detect the failure of the pass-through device by analyzing packet history.

25. The network switch apparatus of claim 23, wherein the logic device is configured to detect the failure of the pass-through device by analyzing port statistics.

26. The network switch apparatus of claim 21, wherein the by-pass device comprises a mechanical relay system.

27. The network switch apparatus of claim 26, wherein the mechanical relay system has a relay component that electrically connects the first and the second network ports to form a communication path, and disconnects the packet switch from the communication path in the third mode of operation.

28. The network switch apparatus of claim 27, wherein the relay component is configured to directly electrically connect the first and the second network ports when there is no power applied to the by-pass device.

29. The network switch apparatus of claim 21, wherein the by-pass device is optical based.

30. The network switch apparatus of claim 21, further comprising a filter for filtering additional packets received from the first network port such that a first subset of the additional packets is passed to the first inline port, while a second subset of the additional packets is passed to the second network port.

31. The network switch apparatus of claim 21, further comprising additional inline ports for coupling to one or more additional pass-through devices, and a filter configured to pass additional packets received from the first network port to the pass-through device and the one or more additional pass-through devices such that all of the pass-through devices collectively can handle at least 10 Gigabytes (10G) communication without a need to randomly drop packets.

32. The network switch apparatus of claim 21, wherein the pass-through device comprises an intrusion prevention system.

33. The network switch apparatus of claim 21, wherein the network switch is configured to add a label to the first packet before passing the first packet to the first inline port, and remove the label from the first packet before transmitting the first packet to the second network port.

34. The network switch apparatus of claim 21, further comprising a housing for containing the by-pass device and the packet switch.

35. The network switch apparatus of claim 21, further comprising an instrument port for connection to a non-pass through device.

36. The network switch apparatus of claim 35, wherein the non-pass through device comprises a sniffer, an intrusion detection system (IDS), or a forensic recorder, and the pass through device comprises an intrusion prevention system (IPS), and wherein the network switch apparatus further comprises a logic device for comparing performance of the non-pass through device and performance of the pass through device.

37. The network switch apparatus of claim 21, wherein the single device is configured for deployment at a geographical location.

38. The network switch apparatus of claim 21, wherein the first network port, the second network port, the first inline port, and the second inline port are at one or more sides of the housing.

39. A network switch apparatus, comprising:
a housing;
a first network port;
a second network port;
a first inline port;
a second inline port, wherein the first and second inline ports are for communication with a pass-through device;
a packet switch in the housing;
a by-pass device in the housing; and
a logic device;
wherein in a first mode of operation, the packet switch and the first and second inline ports are involved in packet transmission between the first and the second network ports;
wherein in a second mode of operation, the packet switch is involved, and the first and second inline ports are not involved, in the packet transmission between the first and the second network ports;
wherein in a third mode of operation, the packet switch and the first and second inline ports are not involved in the packet transmission between the first and the second network ports; and
wherein the network switch apparatus is a single device, and wherein the housing, the first network port, the second network port, the first inline port, the second inline port, the packet switch, and the by-pass device are parts of the single device;
wherein the logic device comprises a register, wherein a central-processing-unit (CPU) periodically writes to the register, and the logic device is configured to close mechanical relay to connect the first and second network ports when the logic device determines that nothing is written to the register for a prescribed period.

40. A network switch apparatus, comprising:
a housing;
a first network port;
a second network port;
a first inline port;
a second inline port, wherein the first and second inline ports are for communication with a pass-through device;
an instrument port for connection to a non-pass through device;
a packet switch located in the housing for transmitting a packet received at the first network port to the non-pass through device via the instrument port, and to the pass through device via the first inline port;
wherein the network switch appliance is a single device, and wherein the housing, the first and second network ports, the first and second inline ports, the instrument port, and the packet switch are parts of the single device and; wherein the non-pass through device comprises a sniffer, an intrusion detection system (IDS), or a forensic recorder, and the pass through device comprises an intrusion prevention system (IPS), and wherein the network switch apparatus further comprises a logic device for comparing performance of the non-pass through device and performance of the pass through device.

41. The network switch apparatus of claim 40, wherein the single device is configured for deployment at a geographical location.

42. The network switch apparatus of claim 40, wherein the first network port, the second network port, the first inline port, the second inline port, and the instrument port are at one or more sides of the housing.

43. A network switch apparatus, comprising:
a housing;
a first network port for communication with a first node;
a second network port for communication with a second node;
a first inline port;
a second inline port, wherein the first and second inline ports are for communication with a pass-through device;
a third inline port and a fourth inline port, wherein the third and fourth inline ports are for communication with an additional pass-through device; and
a processing module located in the housing and configured for transmitting a first subset of packets received from the first node at the first network port to the pass-through device via the first inline port, and passing a second subset of the packets received from the first node at the first network port to the second node via the second network port, in accordance with a predefined logical scheme;
wherein the network switch appliance is a single device, and wherein the housing, the first and second network ports, the first and second inline ports, and the processing module are parts of the single device; and
wherein the processing module is configured for transmitting a third subset of the packets received from the first node at the first network port to the additional pass-through device via the third inline port.

44. The network switch apparatus of claim 43, wherein the second inline port is configured to receive the first subset of the packets from the pass-through device after the pass-through device has processed the first subset of the packets, and wherein the processing module is configured to pass the first subset of the packets to the second node via the second network port.

45. The network switch apparatus of claim 43, wherein the processing module is configured to examine the packets, and determine whether to send at least some of the packets to the pass-through device or the additional pass-through device based on a result of the examination of the packets.

46. The network switch apparatus of claim 43, wherein the processing module is configured to pass the packets to the second instrument port, the first inline port, and the third inline port, such that the pass-through device and the additional pass-through device collectively can handle communication without a need to randomly drop packets.

47. The network switch apparatus of claim 43, wherein the pass-through device comprises an intrusion prevention system (IPS).

48. The network switch apparatus of claim 43, wherein the single device is configured for deployment at a geographical location.

49. The network switch apparatus of claim 43, wherein the first network port, the second network port, the first inline port, and the second inline port are at one or more sides of the housing.

* * * * *